No. 627,093. Patented June 20, 1899.
J. W. BONTA.
APPARATUS FOR MAKING GLASS PIPE.
(Application filed Nov. 11, 1897.)

(No Model.) 2 Sheets—Sheet 1.

Witnesses:
Inventor:
James W. Bonta.
by his Attorneys,

THE NORRIS PETERS CO., PHOTO-LITHO., WASHINGTON, D. C.

No. 627,093. Patented June 20, 1899.
J. W. BONTA.
APPARATUS FOR MAKING GLASS PIPE.
(Application filed Nov. 11, 1897.)
(No Model.) 2 Sheets—Sheet 2.
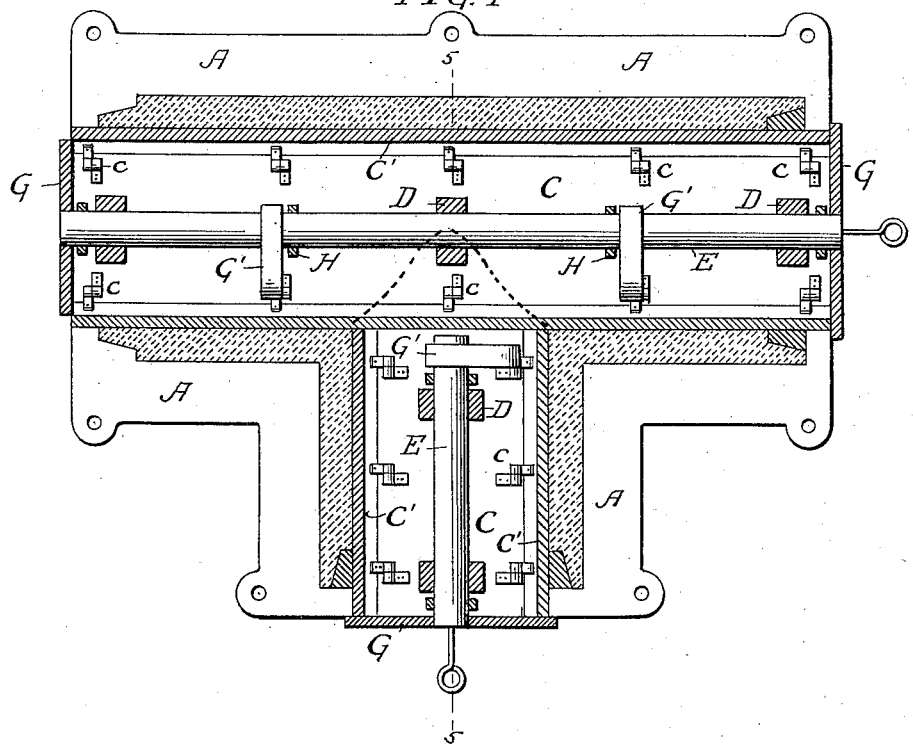
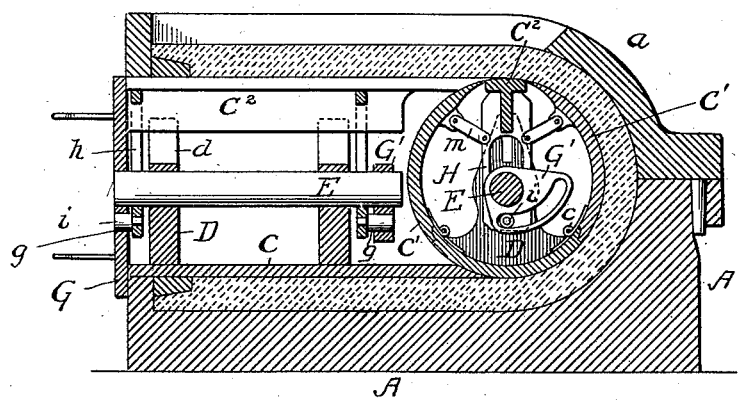

UNITED STATES PATENT OFFICE.

JAMES W. BONTA, OF WAYNE, PENNSYLVANIA, ASSIGNOR TO THE BONTA GLASS PIPE AND CONDUIT COMPANY, OF SCRANTON, PENNSYLVANIA.

APPARATUS FOR MAKING GLASS PIPE.

SPECIFICATION forming part of Letters Patent No. 627,093, dated June 20, 1899.

Application filed November 11, 1897. Serial No. 658,138. (No model.)

*To all whom it may concern:*

Be it known that I, JAMES W. BONTA, a citizen of the United States, and a resident of Wayne, county of Delaware, State of Pennsylvania, have invented certain new and useful Improvements in Apparatus for Making Glass Pipe, of which the following is a full, clear, and exact description, reference being had to the accompanying drawings, forming part of this specification.

My invention relates to certain improvements in apparatus for manufacturing glass pipe, and relates more especially to the manufacture of angular elbows, T's, and other angular joints or connections between main and branch conduits, as more fully set forth hereinafter.

Figure 1:
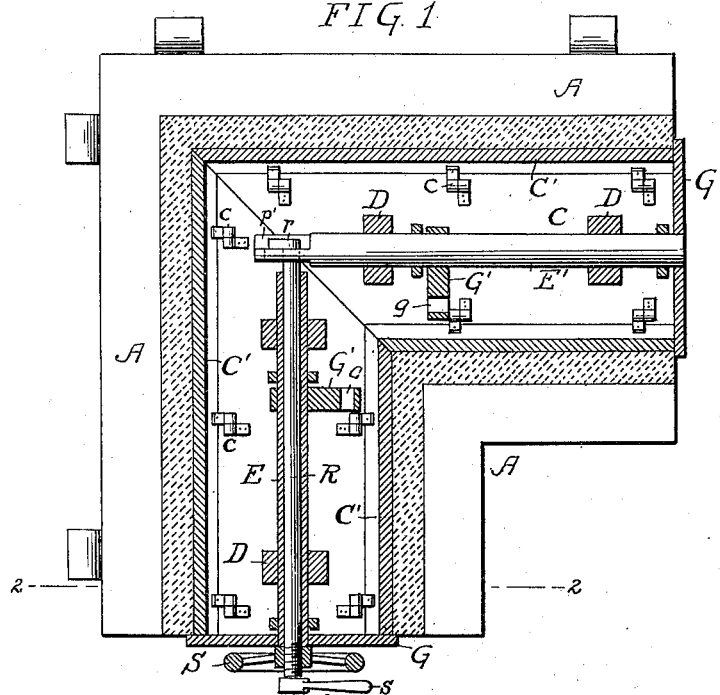
Figure 2:
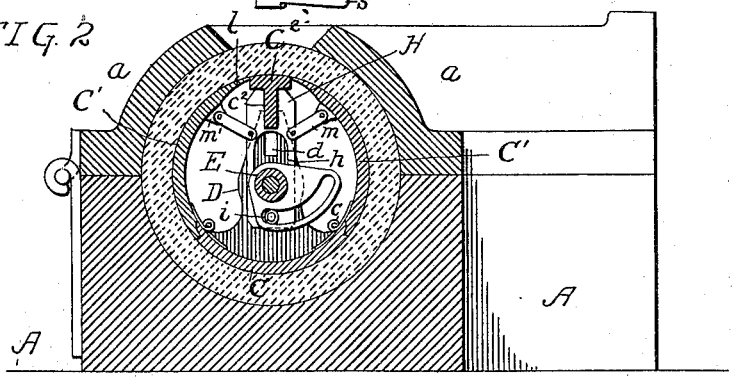
Figure 3:
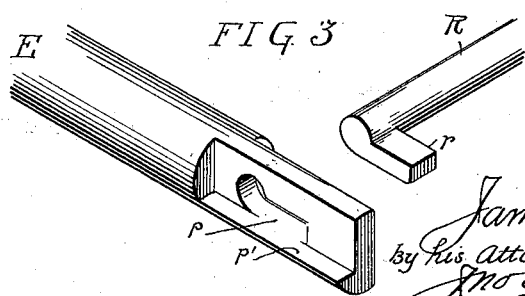

In the accompanying drawings, Figure 1 is a sectional plan view of an apparatus for manufacturing angular elbows in accordance with my invention. Fig. 2 is a transverse sectional elevation of the same on the line 2 2, Fig. 1. Fig. 3 is a detached perspective view of details of the structure. Fig. 4 is a sectional plan view of an apparatus for the manufacture of T-joints in accordance with my invention; and Fig. 5 is a sectional view of the two portions of the T-joint core on the line 5 5, Fig. 4.

The pipe most commonly employed for conducting water and similar fluids is made of iron, and owing to the rapid oxidation which takes place and the danger incurred from electrolysis in the neighborhood of electric street-railways or underground electrical conductors the life of the pipe is materially shortened and often proves a source of danger and inconvenience, where, owing to the presence of an electric current, the iron of the pipe is gradually destroyed, this being especially the case in mining districts, where the water is likely to be polluted with mineral matter. To overcome these difficulties, I have manufactured pipe of glass and have found that owing to its properties as a non-conductor and its durability and economy of manufacture the article possesses desirable properties, which cannot be found in pipe made of any other material.

In the accompanying drawings, A represents the bottom section of a mold, formed of iron or other suitable material, and to this bottom section are hinged top or side sections $a$, the point of connection or contact between the hinged sections being on a horizontal diameter of the mold, so that when the top sections are thrown back or removed the manufactured pipe may be readily transferred to the annealing-oven. The top sections of the mold in lieu of being hinged to the bottom section may be connected thereto by the ordinary pin-and-socket connections ordinarily employed between the flask and cope of an ordinary sand mold. The top sections $a$ are separated at the upper central portions of the mold by a space of sufficient width to permit the pouring of the glass in the casting operation.

The inner diameter of the elbows or T's manufactured is governed by a contractile core of suitable construction, one form of which is herein described, although it will be understood that any other suitable or ordinary form of contractile core may be employed without departing from my invention. The core in the present instance comprises a base-section C, side sections C', hinged thereto, and a radially-movable filling-bar $C^2$.

Referring first to the general character and operation of the core-section, D represents a block or blocks secured to the base-section C and adapted for the support and guidance of a shaft E, to which are secured end plates G, having cam-slots $g$, and at intervals throughout the length of the shaft are secured blocks G', having similarly-slotted cams $g$. The filling-bar $C^2$ is of T shape in cross-section, and its central depending web or flange $c^2$ is adapted to slotted guideways $d$, formed in the upper portions of the blocks D, so that the bar in its movement toward and from the center of the core will be guided in a radial line. To the web or flange $c^2$ of the filling-bar are secured at intervals a number of plates H, slotted at $h$, so that they may pass around the shaft E, the slot being of a width somewhat greater than the diameter of the shaft, so that said shaft will act as a guide to retain the plates in proper position. Each plate H carries a stud or antifriction-roller $i$, adapted to one of the cam-slots g, the arrangement and operation being such that on the turning of the shaft the cams, through the antifriction-rollers i and plates H, will act to move the filling-bar toward and from the center of the core.

The side sections or wings C' are hinged at c to the edges of the base-section C, and in order to prevent the entrance of any material to the interior of the core the point of contact between the base-section and the hinged sections is concentric to the center of the hinged pivot. The opposite ends of the hinged section C' are cut away at l to form a comparatively sharp edge, so that after the filling-bar commences its inward movement in the contraction of the core the hinged sections will be free to move from the expanded to the contracted position, the necessary inward movement of the hinged sections being given by the downward movement of the plates H, which are connected by links m to lugs m' on the inner surfaces of said hinged sections.

In the core for the formation of the angular elbow shown in Figs. 1, 2, and 3 the shaft E of the one portion of the core is solid and at its inner end is provided with an opening p for the reception of a locking-rod R, which extends through and is guided by the hollow shaft of the opposite sections of the core. At the end of the second shaft, as shown more clearly in Fig. 3, is formed a flat surface p' in line with the lower wall of the opening p, and the shaft is to some extent reduced in diameter, so that the locking-rod R may more readily pass through the opening p.

The locking-rod R has at its inner end a projecting lug r, which is adapted to pass through the opening p, and at the opposite end of the rod, at a point outside of the core, is a lever or handle s, which may be turned to turn the lug r after it has passed through the opening p, and thus lock the two cam-shafts to each other, and when so locked each will act to partly support the opposite section at the angle of the elbow. After the lug r has been turned to the locking position a locking-nut S, arranged on the outer threaded portion of the rod R, is turned until it is jammed against the end plate G and draws the edge of the lug against the flattened edge of the shaft E' and firmly holds the two portions of the core in proper position. In the manufacture of an elbow the molten glass is poured into the mold through the space between the sections a, the excess of glass removed from the space between the top sections, the outside of the pipe shaped to curved form by a suitable implement, such as a slick, used by glass-molders, and after the glass has partially set and it is desired to remove the cores the shaft E is rotated by the handle s of rod R, the two (the shaft and the rod) being locked together by the nut S. The locking-nut S is turned until it is free from engagement with the outer face of the end plate G. The rod R is turned until the lower surface of the lug r comes into contact with the flat surface p' at the lower wall of the opening p, thus unlocking the two portions of the core and permitting their withdrawal from the open ends of the elbow. The top sections a of the mold may then be removed and the manufactured pipe transferred to the leer to be annealed.

The T-core differs somewhat from the elbow-core in that the peripheries of the core-sections are arranged to interlock instead of effecting the locking of the cam-shafts. The structure, so far as regards the movable sections, may be of the character hereinabove described with reference to the angular core or of any of the ordinary contractile cores employed for the production of pipe or other tubular articles.

As illustrated in Figs. 4 and 5, the longer portion of the core is straight and extends from end to end of the main portion of the mold, while the smaller portion of the core has its inner end of suitable shape to fit over and partly embrace the main portion of the core, the said smaller portion having at its inner end a recess curved to conform to the periphery of the main section, and thus provide for an exterior support of the smaller section and avoid the cutting away of the sections which form the main portions of the core.

The operation of pouring the glass is precisely the same as that followed in the formation of the elbow, as hereinbefore described, and the manufactured T is removed to the annealing-oven and annealed.

Having thus described my invention, what I claim, and desire to secure by Letters Patent, is—

1. A contractile core made in two or more sections detachably connected at an angle to each other and means at the outer end of one of the sections for connecting and disconnecting said sections.

2. Apparatus for manufacturing pipe, consisting of a sectional mold, and a contractile core formed in two or more detachable sections connected at an angle to each other, means for engaging and disengaging the sections at the outer end of one of the sections, and means for contracting the section.

3. Apparatus for manufacturing pipe, consisting of a sectional mold, a contractile core formed in two or more radially-movable sections, operating-shafts detachably connected at an angle to each other, a locking-bar in one of said shafts and means for expanding and contracting the sections.

4. Apparatus for manufacturing pipe, consisting of a sectional mold, a contractile core formed in two or more detachable sections, an axial bar in each section provided with interlocking adjacent ends, means for engaging and disengaging said bars, and means for expanding and contracting the sections.

5. Apparatus for manufacturing pipe, consisting of a sectional mold, a contractile core formed in two or more detachable sections, a bar in one section having a slot near its inner end, a bar in the other section having a lug at its inner end to engage said slot, means for operating the latter bar and means for expanding and contracting the sections.

In witness whereof I have hereunto set my hand this 4th day of November, A. D. 1897.

JAMES W. BONTA.

Witnesses:
 JNO. E. PARKER,
 J. HENDERSON.